United States Patent [19]
Charlett

[11] 3,855,699
[45] Dec. 24, 1974

[54] FLOWER CUTTER

[76] Inventor: Dante J. Charlett, R.D. No. 1 Box 73, Cabot, Pa. 16023

[22] Filed: Apr. 24, 1974

[21] Appl. No.: 463,609

Related U.S. Application Data

[63] Continuation-in-part of Ser. No. 321,701, Jan. 8, 1973, abandoned.

[52] U.S. Cl. .................................. 30/135, 30/242
[51] Int. Cl. ............................................ B26b 13/26
[58] Field of Search ............ 30/131, 134, 135, 241, 30/242, 243, 258

[56] References Cited
UNITED STATES PATENTS

| | | | |
|---|---|---|---|
| 46,797 | 3/1865 | Harris | 30/242 |
| 460,903 | 10/1891 | Woodward | 30/135 |
| 1,151,874 | 8/1915 | Harris | 30/134 |
| 2,856,686 | 10/1958 | Stanley | 30/131 |

FOREIGN PATENTS OR APPLICATIONS

| | | | |
|---|---|---|---|
| 130,148 | 4/1902 | Germany | 30/242 |
| 14,967 | 3/1905 | Great Britain | 30/135 |
| 853,901 | 11/1960 | Great Britain | 30/241 |

Primary Examiner—Al Lawrence Smith
Assistant Examiner—J. C. Peters
Attorney, Agent, or Firm—Buell, Blenko and Ziesenheim

[57] ABSTRACT

The specification discloses a flower stem cutting instrument designed to be held and operated with one hand. The instrument grasps the severed portion of the flower coincidentally with the cutting operation and enables the operator to lift and deposit the flower conveniently. The instrument comprises a cutter blade fixed on the distal end of a tube held at its one end by a pistol-grip handle. A laterally slotted shear member in which the flower stem is caught is actuated relative to the cutter blade to sever the stem. Cooperating brackets on the shear member and blade grip the stem between them at the approximate end of the cutting stroke. The shear member is actuated by a lever pivoted on the handle, when squeezed by the fingers of the hand holding the instrument.

5 Claims, 6 Drawing Figures

FLOW CUTTER

This is a continuation-in-part of my co-pending application Ser. No. 321,701, filed Jan. 8, 1973, now abandoned.

This invention relates to flower cutter or pruning instruments designed to be held and operated in one hand. More particularly, it relates to an instrument of sufficient length to enable a person to perform a flower cutting or pruning operation while standing upright, and without the necessity for stoopping or bending.

Pruning instruments are known which combine the features of the conventional hand pruner and of the pole or extended length type pruner, and, at the same time are of such light weight as to enable the instrument to be held and operated by a single hand. U.S. Pat. No. 2,270,495, issued Jan. 20, 1942, discloses a pruning implement of this type. In this patent a so-callled anvil or shearing element is fixed on the end of a pole held at the opposite end by a handle, and a cutter blade cooperating therewith is actuated via a rod and a connected bell-crank lever pivoted on the handle.

The space between the anvil and the edge of the cutter blade forms a slot in which a stem, twig or branch may be engaged or caught to hold it in position for severance. This implement has only a limited cutting force by reason of the fact that the cutter blade is actuated by a compression force transmitted through a slender rod. MOre recently, pruning implements or cutters have been proposed in which the cutting blade is actuated by a piston subjected to fluid pressure to obtain greater cutting power. U.S. Pat. Nos. 3,008,234 and 3,509,706 are typical of such implements.

It is an object of this invention to provide an improved form of flower cutter or pruning implement of the extended length type designed to be held and operated manually by one hand, in which the handle for the implement is of a pistol-grip type and is otherwise so designed as to enable exceptional cutting power or force to be realized.

A further object of this invention is to enable the stem of a flower, which is obscured from the vision of a person desiring to sever it, to be engaged and grasped by sense of touch with assurance.

In order to realize the object of this invention, I provide a flower cutter implement comprising two cooperating shearing members, one of which is a hook-shaped member having a knife-edge slot in which a stem, twig or branch is caught and the other of which is a cutter blade the cutting edge of which is angularly disposed with respect to the slot in the hook-shaped member. In contrast to heretofore known implements of this type, the cutter blade is fixed on the outer edge of a tubular pole member of convenient length, such as several feet, held stationary by a pistol-grip handle at the opposite end, while the hook-shaped member is slidingly carried by the cutter blade and activated relative thereto by a rod, telescopically extending through the tubular pole member, on which a pulling force is exerted by a lever that is pivotally mounted on the pistol-grip handle.

I further provide a flower cutter implement characterized by a hook-shaped shear member in which the outer edge of the stem receiving slot projects laterally with respect to the inner edge and the side edge of the fixed cutter blade serves as a guide by which a flower stem, along which the implement is drawn, is directed with assurance into the slot by sense of touch of the operator, the longer outer edge of the slot serving as a limiting stop for the stem.

I further provide a flower cutter of the before described construction, in which the stationary cutter blade and its cooperating movable hook-shaped shearing element are adapted, by cooperating angle brackets thereon, to grasp or hold the stem of a flower substantially at the instant of severance. This makes it possible for a person to sever a flower stem, lift the severed flower and stem, and deposit it with relative ease and without stooping or bending. I am aware of small conventional hand-held pruning shears having means for holding a severed flower after severance of the stem. However, by arranging for adjusting the position of one of the brackets on the shear element, varying diameter stems or twigs may be accommodated.

Several embodiments of my flower cutter implement, including a preferred embodiment, are hereinafter fully described in relation to the accompanying drawings, wherein.

Figures 1, 2:
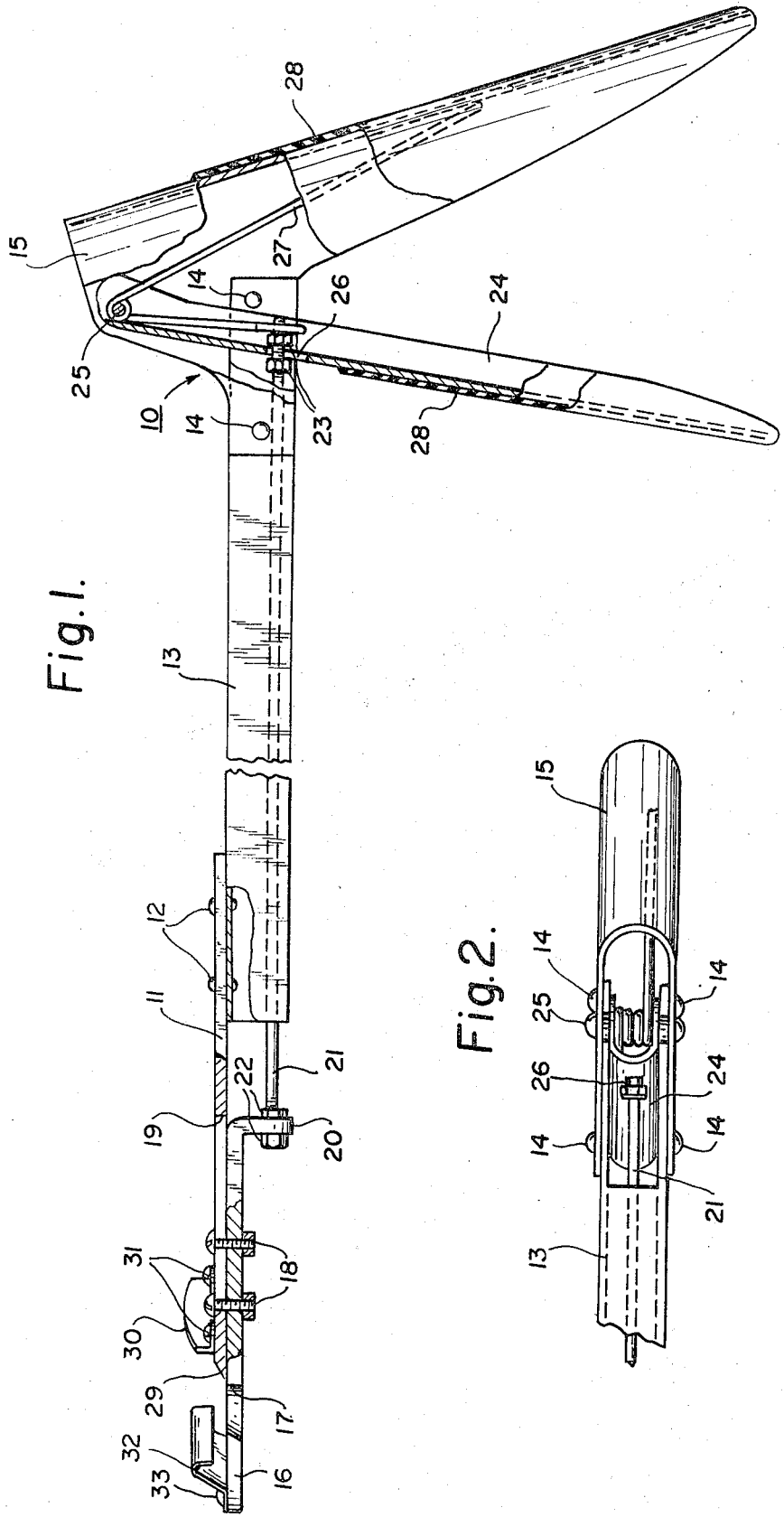
FIG. 1 is a side elevational view thereof, partly in section and at substantially full scale, but broken longitudinally to accommodate the view to the size of the sheet.
FIG. 2 is a fragmentary plan view, showing additional details of the pistol-grip handle in FIG. 1.
Figure 3:
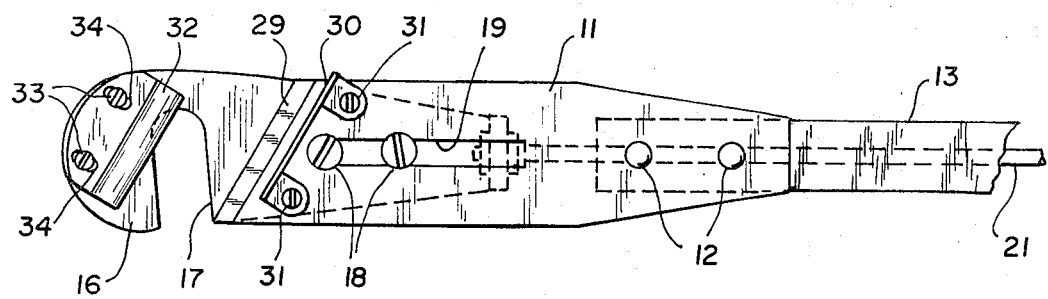
FIG. 3 is a fragmental plan view, showing additional details of the stationary cutter blade and the cooperating hook-shaped shearing element of FIG. 1 in their relative positions while inactivated.

Referring to the drawings, FIGS. 1 to 4, the embodiment of flower cutter 10 there shown comprises a cutter blade 11 fixed, as by rivets 12, on the outer end of a tubular pole 13, to the opposite end of which is secured as by a plurality of rivets 14, a pistol-grip type of handle 15.

the pole 13 and handle 15 are preferably of light weight high-strength metal, such as aluminum, magnesium or alloys thereof. Pole 13 may of any suitable cross-section, though as shown it is of hollow square cross-section. The handle 15 is shown as made of sheet metal bent into a U-shaped configuration. The end of pole 13 extends between the side walls of handle 15 to which it is attached as by the rivets 14.

The flower cutter 10 further comprises a hook-shaped shear member 16 having a lateral slot 17, of a width to receive flower stems therein. The shear member 16 is slidingly attached to the cutter blade 11, by several bolts or rivets 18 which extend through a longitudinal slot 19 in the cutter blade. The shear member 16 has a projecting leg 20 to which one end of a rod 21 is secured as by nuts 22 on the threaded end of the rod. Rod 21 extends telescopically and longitudinally through the tubular pole 13 and is connected to a lever 24, as by a pair of spaced nuts 23 on the threaded end of the rod.

Lever 24 is of sheet metal, such as aluminum, magnesium, or alloys thereof, bent into a U-shaped cross section. The side walls of the lever are enlarged or flared at one end and there provided with registering holes, for receipt of a pivot pin or rivet 25 supported in the side walls of the handle 15. The wall of the lever 24 has a slot 26 through which the end of rod 21 extends, the nuts 23 being on opposite sides of the lever wall. As will become apparent later, the nut 23 outside the lever 24 may be omitted, if desired.

The lever 24 is relatively long in relation to the moment arm between the pivot pin 25 and the point of attachment of rod 21 to the lever. As shown, a ratio of approximately 4 to 1 between the length of the lever and the moment arm is depicted. It will be apparent, therefore, that when the lever is squeezed toward the handle 15 by the fingers of the same hand that holds the handle, a considerable force amplification occurs by which the shear member 16 is activated toward the cutter blade 11.

A return spring 27, in the form of a central helix section and two end leg portions, is provided for returning the lever 24 reversely after it has been squeezed toward the handle 15. The spring 27 is mounted by inserting the pivot pin 25 through the helix section of the spring, with one end leg projecting down into and against the back wall of the handle 15 and with the other leg extending down into the lever 24.

The end of the leg of spring 27 within the lever 24 is formed in a loop or eye through which the end of rod 21 extends. With this arrangement, return spring 27 simultaneously and yieldingly resists movement of the lever 24 and rod 21 and also simultaneously reversely biases both the rod 21 and lever 24.

As seen in FIG. 1, the outside surface of the lever 24 and handle 15 may be covered with a layer 28 of rubber or other elastomeric composition to soften the grasp of the user's hand thereon. This layer may be applied in any desired manner as by dipping the lever and handle in a container of rubber, or rubber composition while in liquid or viscous form.

It will be seen that the cutter blade 11 is ground to a knife-edge 29 at its outer end which is angularly disposed with regard to the slot 17 in the shear member 16. As will be seen in FIG. 1, the edges of the slot 17 are ground to form a knife-edge at the upper surfaces of the shear member 16. As the shear member 16 is activated by squeezing the lever 24 toward the pistol-grip handle 15, the slot 17 is moved toward the knife-edge 29. It will thus be apparent that the angle of the knife-edge 29 is such that the blade 11 first closes the end of the slot 17 and there engages and moves a flower stem within the slot toward the closed end of the slot, and at the same time causes the knife-edge 29 to slide across the stem, as distinct from a pressure-applied cut. In effect, the stem of a flower is locked within the slot 17 by the cooperative action of the slot and the knife-edge 29 and cannot slip sideways out of the slot during the severing operation.

The cutter blade 11 has an angle bracket 30 of sheet metal attached thereto in substantially parallel spaced relation to the knife-edge 29, as by rivets 31 or by welding. In a similar manner, shear member 16 also has an angle bracket 32 of sheet metal adjustably attached thereto in approximate parallel relation to the bracket 30. The base of bracket 32 is adjustably attached to the shear member by screws 33 which extend through slots 34 in the base. The purpose of the adjustment will become apparent later. As will be apparent from FIG. 3, the inside edge of the base of the bracket 32 is sufficiently spaced from the slot 17 to insure complete passage of the slot 17 past the knife-edge 29 on the cutter blade. The upright part of the bracket 32 is in the form of an inverted V having a long leg joined to the base and a short leg which projects slightly over the slot 17 and permits the knife edge 29 to pass thereunder. The sheet metal of which bracket 32 is made is such that the upright part can flex resiliently to accommodate varying thicknesses of stems grasped between the brackets 30 and 32 as presently explained.

In using the above-described flower cutter 10, the user holds it by placing the palm of a hand against the back of the pistol-grip handle 15 and then curves the fingers of the hand around the lever 24. By reason of the length of the tubular pole 13, preferably one to three feet, it is unnecessary for the user to stoop or bend in order to reach a desired flower stem, at a point adjacent the ground. Moreover, possible injury to the user from thorns, as in the case of roses, is avoided.

To sever a flower stem, the user first catches the stem in the slot 17 of the shear member 16 and then simply squeezes lever 24 toward handle 15 sufficiently to cause the shear member 16 to be pulled toward the knife-edge 29 of the cutter blade 11. By reason of the leverage of the lever 24 on the rod 21, and the fact that the rod 21 is in tension, a maximum of shearing effort by the knife-edge 29 on the stem in the slot 17 is obtained. Inasmuch as the slot 17 in the shear member completely passes the knife-edge 29, complete severance of the stem is effected.

Figure 4:
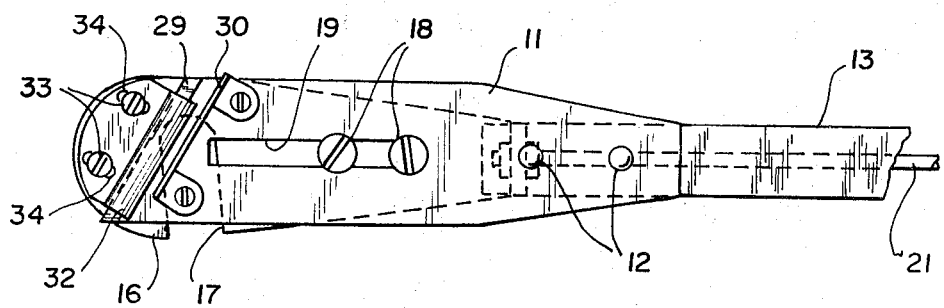
FIG. 4 is a fragmental plan view, corresponding to FIG. 3, but showing the stationary cutter blade and the hook-shaped shearing element in their relative positions when the shearing element is activated.

It will be seen that the upper severed portion of the stem is squeezed between the brackets 30 and 32, which approach each other but remain spaced apart, as shown in FIG. 4, a distance slightly less than the diameter of the stem being severed. Thus, by retaining a grasp on the lever 24 and handle 15, the user may lift the severed flower and deposit it conveniently in a suitable container or vehicle.

On release of pressure on the lever 24, spring 25 automatically biases the shear member 16 back to a position in which slot 17 is again open for subsequent severing operations.

It will be understood that variations in stem thickness or diameter may necessitate some adjustment in the position of bracket 32 relative to bracket 30. Thus for a larger stem diameter, the bracket 32 is adjusted outwardly away from bracket 30, and vice versa for the smaller diameter stems. For minor increases in stem thickness, the resilient upright portion of the bracket 32 yields sufficiently to allow full severance travel of the shear member 16 relative to the knife-edge 29 of the cutter blade 11.

Figure 5:
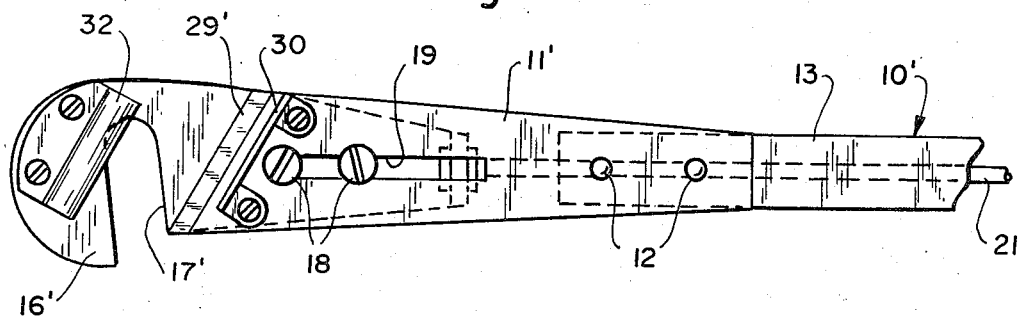
FIG. 5 is a fragmental plan view of a modified form of stationary cutter blade and cooperating hook-shaped shearing element in their relative positions prior to activation.
Figure 6:
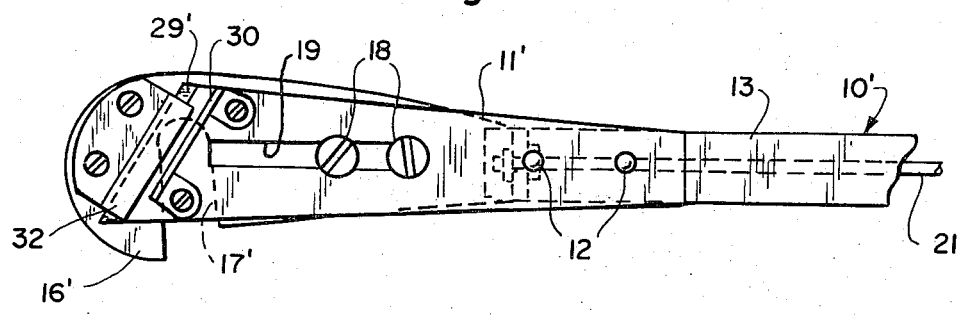
FIG. 6 is a fragmental plan view, showing the relative positions of the stationary cutter blade and the cooperating hook-shaped shearing element of the implement shown in FIG. 5 after activation.

Referring now to FIGS. 5 and 6, a modified form of flower cutter implement 10', which is a preferred embodiment, is there shown and will now be described. For brevity of description, only so much of the implement 10' as differs from the implement 10 will be identified and described, corresponding elements in the two embodiments being otherwise identified by the same reference numerals without further description.

Implement 10' differs from implement 10 in having a cutter blade 11' and a shear member 16' differing in contour from cutter blade 11 and shear member 16. As will be evident in FIGS. 5 and 6, the cutter blade 11' tapers in width directly from the knife-edge 29' to the opposite end adjacent the side surfaces of pole 13, thereby serving as a guide along which a flower stem is directed into the slot 17' of the shear member 16' as the implement 10' is drawn back with respect to the flower stem.

Also for the purpose of insuring that the flower stem does not slide past the slot 17' in the shear member 16' when the stem is obscured from the sight of the operator as the stem moves toward the slot, the outer edge of the slot 17' in the shear member 16' is longer than the inner edge of the slot 17'. Thus, the projection of the outer end of the shear member laterally of the cutter blade 11' acts as a stop to prevent movement of a flower stem past the slot 17' as the flower stem is being guided along the side edge of the cutter-blade 11' toward slot 17'.

It will be seen, therefore, that by the cooperative action of the side edge of the cutter blade 11, acting as a guide, and the longer edge of slot 17', serving as a stop, movement of a flower stem into slot 17' may be accomplished with assurance and largely by sense of touch, without necessity for full sight of the stem by the operator.

It will be understood that, except as here noted, the operation of implement 10' is similar to that previously described for implement 10.

Accordingly, further description of the operation of implement 10' would be repetitious and is therefore omitted.

While I have described herein several forms of an implement for cutting flower stems, it will be apparent that the implement may be used for other purposes, such as pruning of plants and bushes. Also it should be understood that modifications may be made in the described embodiments within the terms of the appended claims.

I claim:

1. An instrument for cutting plant stems and the like, of the type comprising a tubular pole, a pistol-grip handle attached to one end of the pole for supporting it in one hand, a lever pivoted on the handle and arranged to be pivotally squeezed toward said handle by the fingers of the hand by which the handle is held, and a rod telescopically extending through said tubular pole and connected to said lever for actuation thereby, wherein the improvement comprises a knife-edge blade fixed on the distal end of the said tubular pole, a shear member having a laterally extending slot therein for receiving a flower stem and being slidably carried by said blade, the edges of said slot being movable past the knife-edge blade in shearing relation, said shear member being connected to said rod and actuated so as to pull a stem in said slot over the knife-edge blade to effect a severing thereof when the said lever is squeezed toward the handle.

2. An instrument for cutting plant stems and the like according to claim 1, wherein the knife-edge blade is so angularly disposed relative to said laterally extending slot in said shear member, that said knife-edge first closes said slot and then sweeps across the said slot from outside to inside as said shear member moves toward the said cutter blade.

3. An instrument for cutting stems and the like according to claim 1, wherein cooperating bracket means are provided on said shear member and on said blade for grasping and holding therebetween the severed portion of a stem concurrently with the severing operation, at least one of said bracket means being flexible and movably adjustable relative to the other to accommodate stems of varying diametrical thickness.

4. An instrument for cutting plant stems and the like, of the type comprising a tubular pole, a pistol-grip handle attached to one end of the pole for supporting it in one hand, a lever pivoted on the handle and arranged to be pivotally squeezed toward said handle by the fingers of the hand by which the handle is held, and a rod telescopically extending through said tubular pole and connected to said lever for actuation thereby, wherein the improvement comprises a knife-edge blade fixed on the distal end of the said tubular pole, a shear member having a laterally extending slot therein for receiving a flower stem and being slidably carried by said blade, the outer edge of said slot being longer than the inner edge of said slot and both edges of said slot being movable past the knife-edge blade in shearing relation, said shear member being connected to said rod and actuated so as to pull a stem in said slot over the knife-edge blade to effect a severing thereof when the said lever is squeezed toward the handle, and the outer edge of the slot serving as a stop to prevent movement of a stem past the slot as it approaches the slot.

5. An instrument for cutting plant stems and the like according to claim 4, wherein the knife-edge blade tapers in width from the knife-edge thereof to said tubular pole thereby serving to guide a flower stem toward said slot as the instrument is moved back along the stem.

* * * * *